United States Patent [19]

Waldron et al.

[11] Patent Number: 4,524,655
[45] Date of Patent: Jun. 25, 1985

[54] INDEXABLE MACHINE TOOL TURRET AND ATTACHMENTS THEREFOR

[75] Inventors: Joseph P. Waldron, Horseheads; Ivan R. Brown, Breesport, both of N.Y.

[73] Assignee: Hardinge Brothers, Inc., Elmira, N.Y.

[21] Appl. No.: 458,612

[22] Filed: Jan. 17, 1983

[51] Int. Cl.³ .............................................. B23B 29/32
[52] U.S. Cl. .................... 82/36 A; 82/24 R; 29/48.5 R; 74/813 R; 74/813 L; 74/822; 74/826
[58] Field of Search .............. 82/36 A, 24 R, DIG. 1; 29/48.5 R, 48.5 A, 49; 74/813 R, 813 L, 816, 817, 822, 823, 824, 826, 813 C; 192/1, 8 R, 144; 188/311

[56] References Cited

U.S. PATENT DOCUMENTS

| | | | |
|---|---|---|---|
| 2,934,978 | 5/1960 | Estabrook | 74/826 |
| 3,010,348 | 11/1961 | Swanson et al. | 82/24 R |
| 3,054,333 | 9/1962 | Brainard et al. | 74/826 |
| 3,131,599 | 5/1964 | MacFarlane et al. | 82/4 R |
| 3,436,994 | 4/1969 | Diener et al. | 82/24 R |
| 3,492,939 | 2/1970 | Anderson et al. | 188/311 |
| 3,513,734 | 5/1970 | Burroughs et al. | 408/56 |
| 3,545,317 | 12/1970 | Shultz et al. | 82/36 A |
| 3,798,721 | 3/1974 | Schalles | 82/36 A |
| 4,051,750 | 10/1977 | Berly | 82/36 A |
| 4,164,879 | 8/1979 | Martin | 82/36 A |
| 4,262,563 | 4/1981 | Brown et al. | 82/36 A |
| 4,442,576 | 4/1984 | Kitamura | 408/56 |

Primary Examiner—Leonidas Vlachos
Assistant Examiner—Jerry Kearns
Attorney, Agent, or Firm—Shlesinger, Arkwright, Garvey & Fado

[57] ABSTRACT

An indexable machine tool turret comprising a body having a chamber, an opened end, a closed end and a central longitudinal axis; an axially displaceable rotatable turret top plate having a number of angularly spaced apertures for holding tools, said top plate being co-axial with said body axis; an axially displaceable and extending rotatable shaft connected to said top plate, said shaft co-axial with said top plate; two opposed annular face gears for seating said top plate to said body, said gears co-axial with and concentric with said top plate, one of said gears mounted in said top plate for engaging said other gear, said other gear mounted in said body; said shaft including a ring gear mounted concentrically thereto; means for displacing said shaft and thereby said top plate for causing said face gears to engage and disengage; drive means for engaging said ring gear for rotating said shaft when said face gears are disengaged; cushioned stopping means for stopping said shaft rotation; and, angular rotation detection means for determining said shaft rotation as a means for stopping said drive means and activating said stopping means when one of said apertures has reached a predetermined position is disclosed.

20 Claims, 17 Drawing Figures

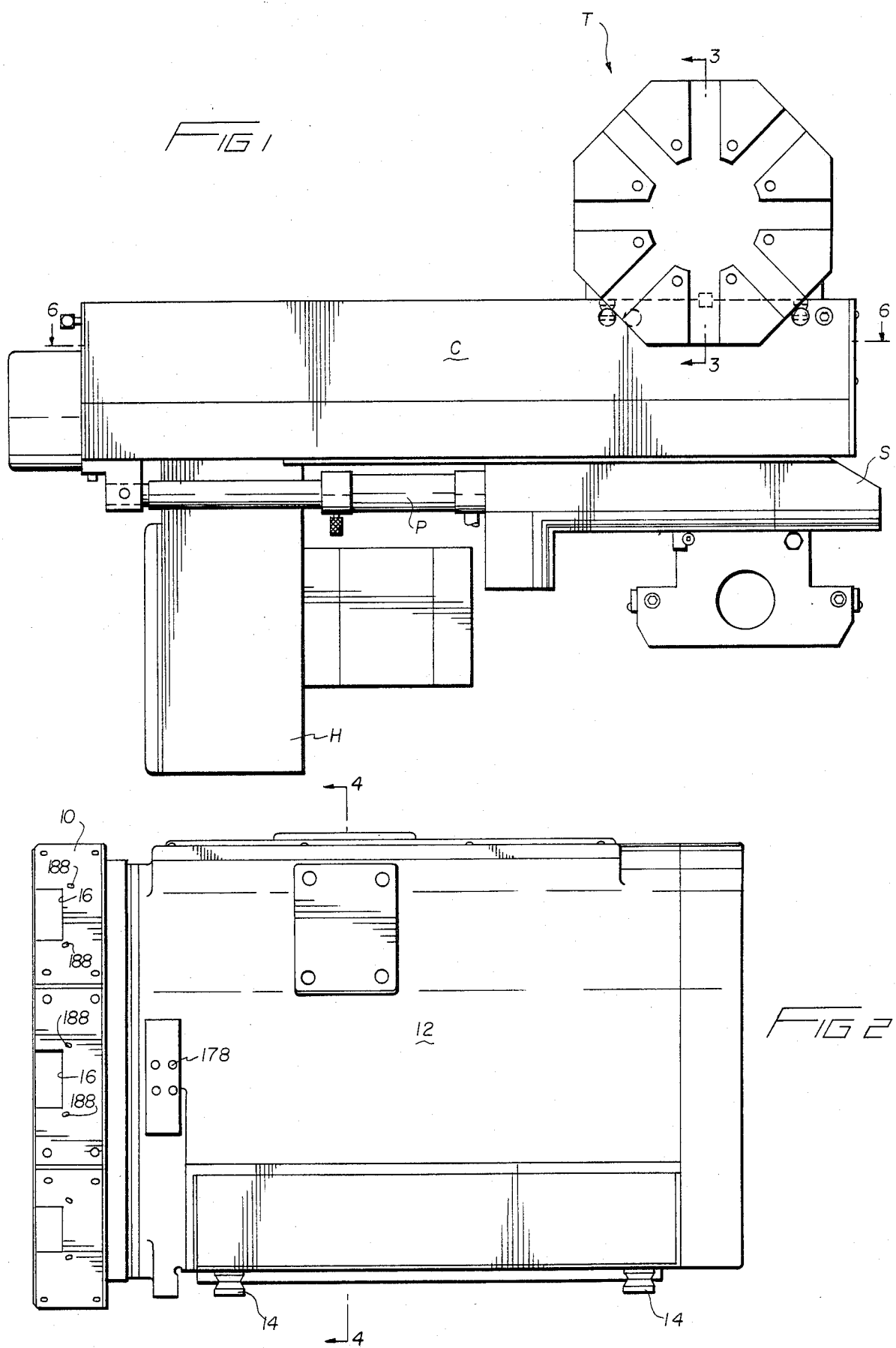

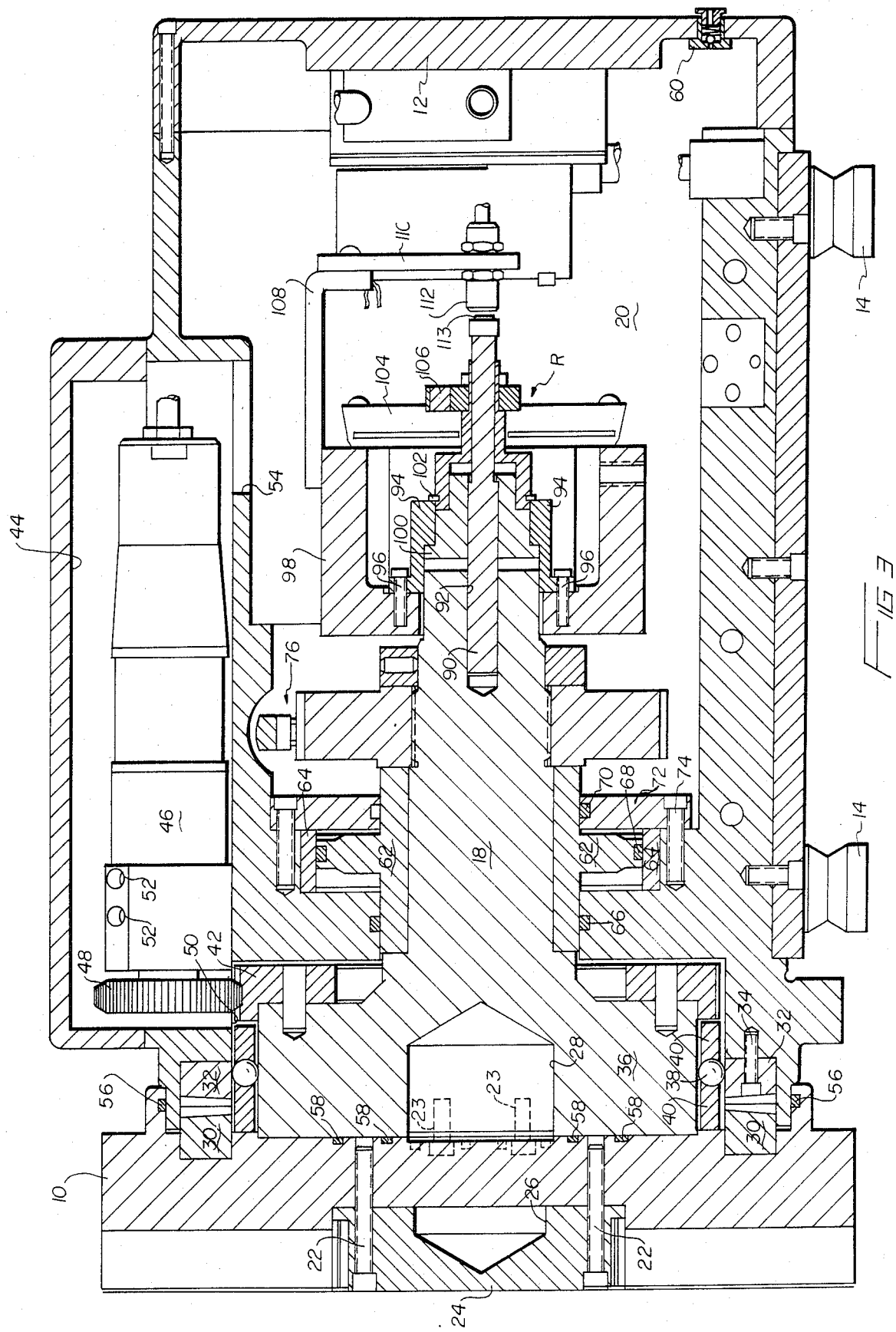

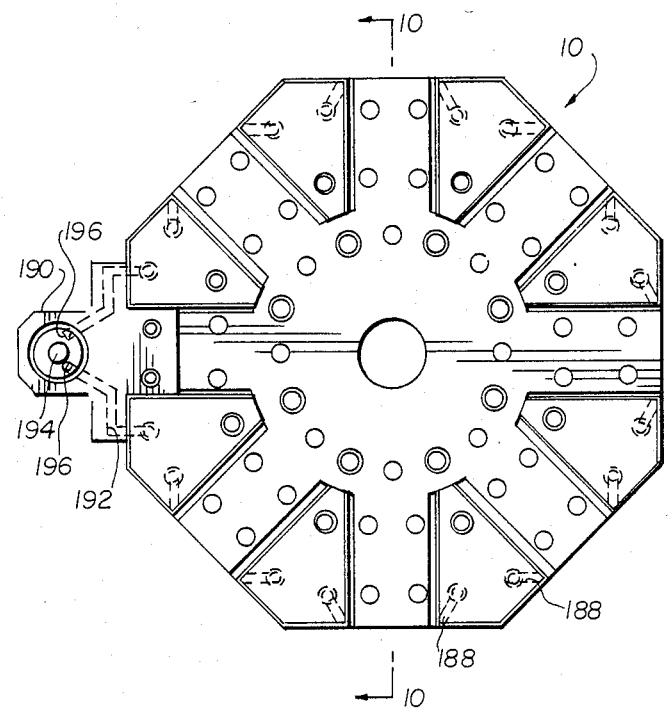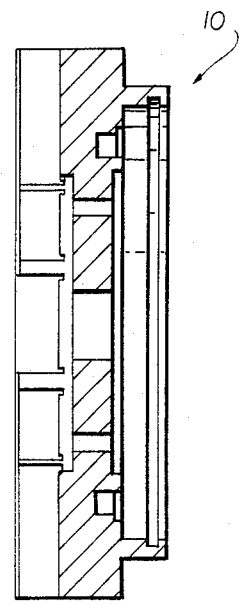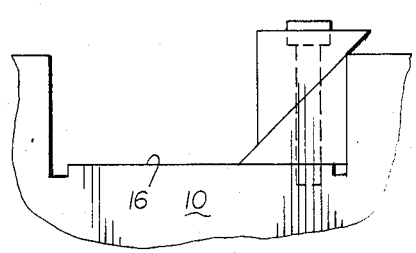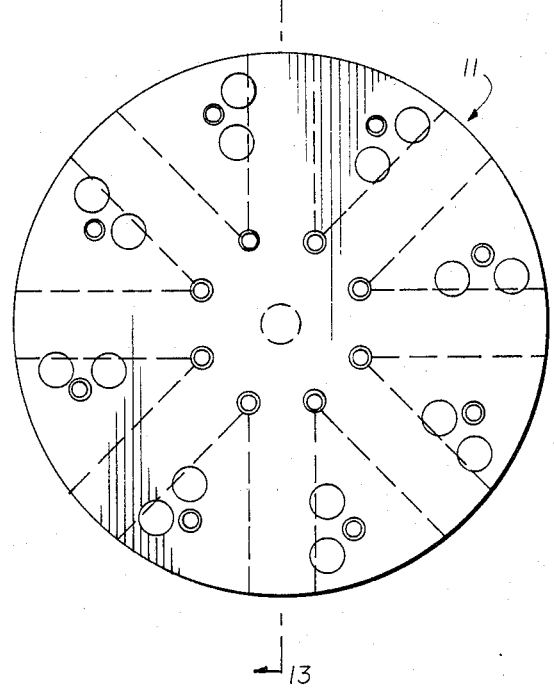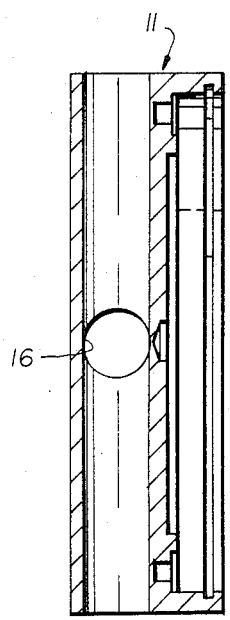

INDEXABLE MACHINE TOOL TURRET AND ATTACHMENTS THEREFOR

BACKGROUND OF THE INVENTION

A turret having the ability to hold several tools and to be able to bring any one of those tools into contact with the work piece is desirable. The efficiency of the machine tool having such a turret is greatly increased as the need to stop the machine while the tools are changed is eliminated. Providing such a machine with a tool coolant mechanism, as well as adapting the turret for being displaceable in at least two axes of motion, is also greatly desirable.

It is know from Brown, U.S. Pat. No. 4,262,563, to provide an indexable machine tool turret capable of bringing any one of a number of tools into working position with the work piece. Brown discloses the use of an air motor driving a gear train for rotating the turret. Additionally, Brown provides a number of keys on the turret body for seating with corresponding key slots in the turret top plate for accurately positioning the turret top plate. A cylinder mechanism is employed for lifting the top plate and disengaging the key slots from the keys so that the air motor may drive the turret. A major problem with Brown is that the air motor vents to the atmosphere and is very loud and objectionable therefore. An additional problem is the relatively large size of the keys with a result that only relatively few keys are possible.

Furthermore, it is known from Martin, U.S. Pat. No. 4,164,879, to provide a rotatable turret with a coolant system for cooling the tool and which system is capable of rotating with the turret. A basic problem with Martin is that the turret is not of the type in which the top plate is axially displaceable and, also, that the coolant system requires a check valve.

While both Brown, and Martin provide partial solutions to the problems of an indexable machine tool turret, they can be improved. The disclosed invention provides an indexable machine tool turret system which is capable of cooling the tool, of selectable indexing the turret top plate, and of being mounted on a cross-slide carriage for providing multiple axes of work.

OBJECTS OF THE INVENTION

It is a primary object of the disclosed invention to provide an indexable machine tool turret having a directly connected air motor for indexing of the turret, said air motor being totally enclosed in a canister for minimizing noise.

It is an additional object of the disclosed invention to provide an indexable machine tool turret in which the interior of the turret is pressurized with exhaust air from the air motor for preventing the entrance of dirt and other contaminants into the interior of the turret.

Still an additional object of the invention is to provide an adjustable pressure reducing valve for maintaining the pressure inside the turret below a pre-determined point.

It is a further object of the disclosed invention to provide a machine tool turret with a coolant assembly for selectively cooling the tool being used and in which the coolant system is capable of being displaced with the axially displaceable turret top plate.

Still another object of the disclosed invention is to provide an indexable machine tool turret having a coolant system which is capable of being mounted on a slide for providing multiple axes of work.

Still a further object of the disclosed invention is to provide an axially displaceable machine tool turret top plate which is capable of being raised and lowered by hydraulic pressure so to apply pressure for engaging and disengaging the top plate positioning elements.

Yet another object of the disclosed invention is to provide magnetic switch means for accurately determining the angular position of the tool as the top plate is rotated and for initiating the raising and lowering the top plate and for initiating the air motor so to cause the turret to rotate.

Yet a further object of the disclosed invention is to provide a slide having a counter-balance assembly for equalizing the capability of the slide to raise and lower the turret along the slide and which includes a braking mechanism for preventing the turret from desending the slide when the hydraulic pressure is relieved.

These and other objects of this invention will be apparent from the following description and claims.

DESCRIPTION OF THE DRAWINGS

In the accompanying drawings which illustrate by way of example various embodiments of this invention:

FIG. 1 is a side elevational view of a turret mounted on a slide and disclosing the slide mounting assembly and counter-balance assembly;

FIG. 2 is a side elevational view of a turret;

FIG. 3 is a cross-sectional view through the turret of FIG. 2;

FIG. 9 is a top plan view of the turret of FIG. 2 and disclosing a tool holder;

FIG. 10 is a cross-sectional view along the section 10—10 of FIG. 9;

FIG. 11 is a cross-sectional view disclosing the square shank tool holder slot of FIG. 9;

FIG. 12 is a top plan view of an end working turret;

FIG. 13 is a cross-sectional view along the section 13—13 of FIG. 12;

DESCRIPTION OF THE DRAWINGS

Figure 4:
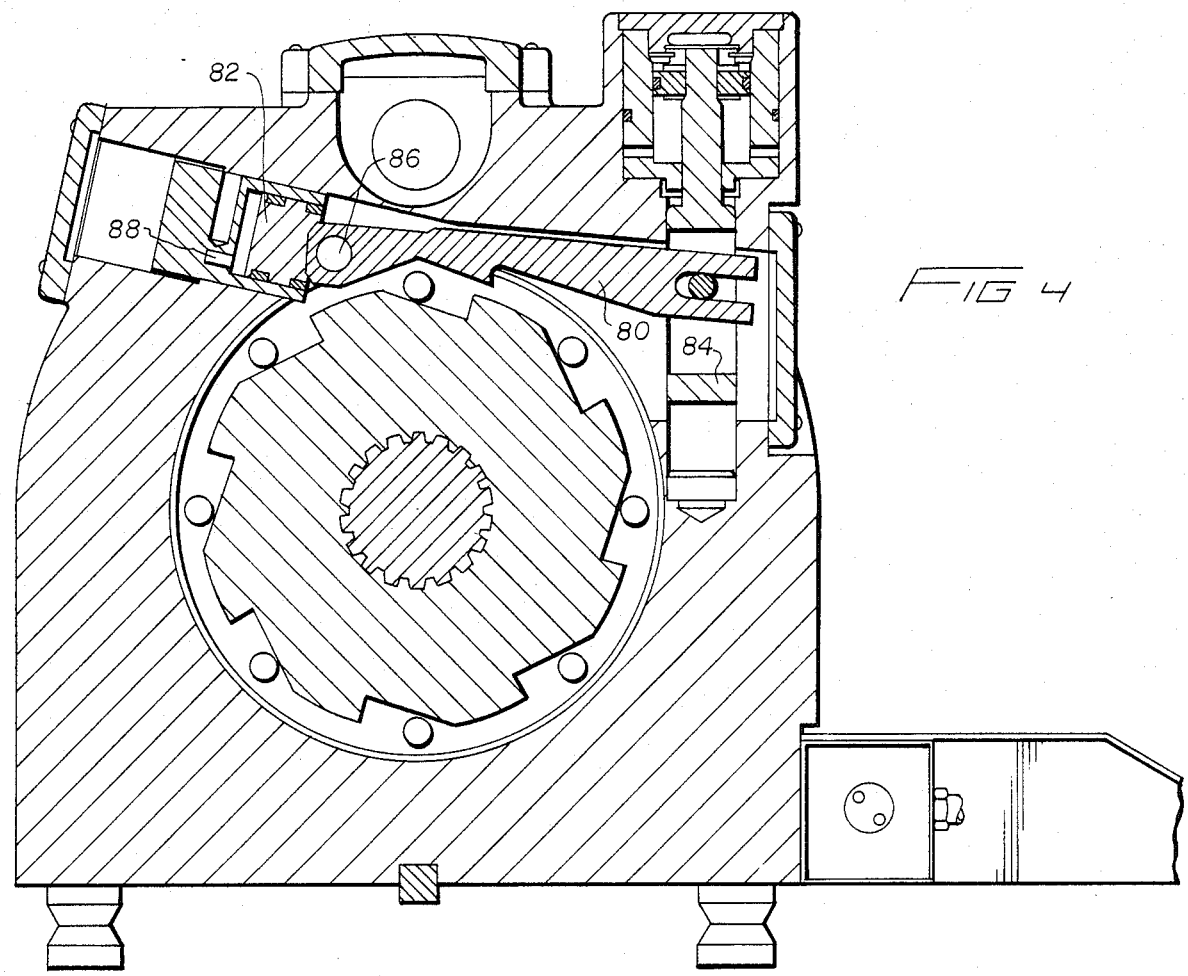
FIG. 4 is a cross-sectional view along the section 4—4 of FIG. 2 and disclosing the cushioned stopping mechansim.

Referring now to FIG. 1, a turret T is mounted on a cross-slide C which is connected to carriage S. Carriage S is adapted for being displaced in a machine tool bed (not shown).

As best shown in FIG. 2, the turret T has a top plate 10 rotateably mounted on a body 12. Body 12 has a number of brackets 14 for mounting turret T to cross-slide C. Top plate 10 has a number of angularly spaced radially extending apertures 16 for holding tools.

As best shown in FIG. 3, top plate 10 is co-axially and rotateably mounted on body 12. An axially extending co-axial turret shaft 18 is connected to top plate 10 and extends some distance into chamber 20 formed in body 12. Top plate 10 has a number of bolts 23 which pass through top plate 10 and secure top plate 10 to turret shaft 18.

Top plate 10 has a concentrically mounted co-axial tool stop 24 which is secured to top plate 10 by bolts 22. Tool stop 24 contains a substantially annular chamber 26 having a conically extending portion for minimizing the weight of top plate 10 and also its inertia thereby. Turret shaft 18 has a correspondingly shaped chamber 28 for likewise minimizing the weight of shaft 18 and reducing the inertia thereby.

An annular face gear 30 is mounted in top plate 10 and has its teeth axially extending toward the closed end of body 12. Face gear 30 is concentrically and co-axially mounted in top plate 10. A correspondingly shaped face gear 32 is mounted in body 12 and has its teeth arranged for engaging the teeth of face gear 30. Consequently, engagement of face gears 30 and 32 provides a mechanism for accurately and positively positioning top plate 10 on body 12. Face gear 32 may be fastened to body 12 by bolt 34.

Shaft 18 has an annular flange or shoulder 36 extending radially into chamber 20. Bearings 38 in race 40 annularly surround shoulder 36 and are positioned between face gears 30 and 32 and shoulder 36 and permit shaft 18 to rotate freely. An annular ring gear 42 is mounted to shoulder 36 by dowel pins 34. Ring gear 42 has radially extending teeth for engaging the rotating mechanism and for supporting bearings 38 and race 40.

An auxiliary chamber 44 external to body 12 is provided for mounting axially parallel air motor 46. Air motor 46 has a radially extending toothed gear 48 for engaging the 127 teeth of ring gear 42. An aperture 50 is provided in body 12 for enabling ring gear 42 and air motor gear 48 to engage. Air motor 46 has exhaust ports 52 for exhausting spent air into auxiliary chamber 44. Auxiliary chamber 44 is connected by aperture 54 to chamber 20 for allowing the exhaust air to enter chamber 20 and to thereby pressurize chamber 20 to prevent the entrance of dirt and other contaminants. Means for providing air to air motor 46 are well known in the art and no mention of them is necessary.

Top plate 10 has an annular O-ring or quad-ring 56 which is mounted in an axially extending flange of top plate 10 which surrounds body 12. Ring 56 provides sliding sealing contact with body 12 for sealing chamber 20. A number of O-rings 58 surround bolts 22 and 23 for preventing entrance or exit of air from chamber 20 through bolts 22 and 23. In this way, chamber 20 is sealed and the exhaust air pressurizes the chamber. An adjustable pressure relief valve 60 is mounted in the closed end of body 12 for lowering the internal air pressure of chamber 20 when the air pressure attains a level in excess of the previously adjusted set point. In this way, the pressure in chamber 20 is prevented from causing O-rings 56 and 58 and from causing excess pressure to build up which may damage the internal components of the turret T.

A piston 62 is circumferentially mounted around shaft 18 for raising and lowering shaft 18, and thereby top plate 10, and for causing face gears 30 and 32 to become engaged and disengaged. Additionally, ring gear 42 is free to slide in engaging contact with gear 48. Piston 62 is hydraulically operated by means well known in the art and no discussion is necessary. Means for providing the hydraulic fluid are likewise well known in the art and are not disclosed. Piston 62 is mounted in a cylinder liner 64 for permitting piston 62 to be axially displaced in liner 64. Annular quad-rings 66, 68 and 70 surround piston 62 for preventing the escape of hydraulic fluid into chamber 20 or entrance of air into cylinder liner 64. An annular flange 72 is fastened by cap screws 74 to body 12 for providing a support for cylinder liner 64.

A cushioned stopping mechanism 76 co-axially mounted on shaft 18 below cylinder 62 is best shown in FIG. 4. Cushioned stopping mechansim 76 has an index plate 78 with a number of angled stopping surfaces for contacting stop pawl 80 which is pinned at one end to cushioning cylinder 82 and at that the other end to a radially extendable piston 84 for pivoting pawl 80 on pin 86 and for causing pawl 80 to contact one of the angled surfaces on index plate 78 and for, thereby, stopping rotation of index plate 78 and shaft 18. Cushioning cylinder 82 is able to absorb the shock caused by the contact of pawl 80 with index plate 78 and is free to be displaced in chamber 88 and to thereby cushion the rapidly applied stopping force.

Figure 17:
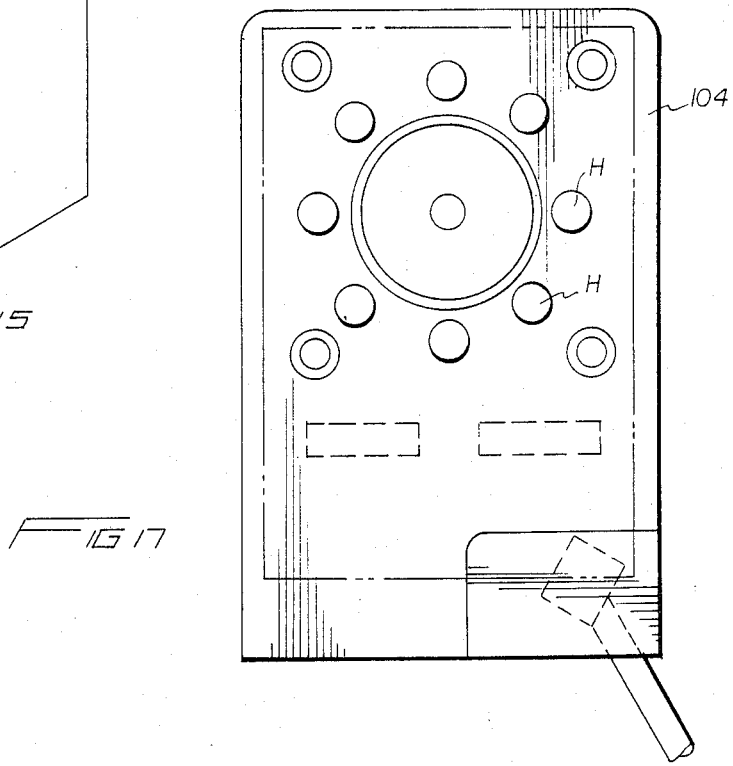

Referring again to FIG. 3, rotation detection means R comprises a magnet drive shaft 90 fixedly mounted in aperture 92 concentrically and co-axially located in shaft 18. A housing 94 is pinned by screws 96 to annular bearing support plate 98. Bearing support plate 98 circumferentially surrounds shaft 18 and provides a means for allowing shaft 18 to rotate and rotateably secures one end of shaft 18. Bushing 100 is concentrically mounted in housing 94 and has an aperture for permitting magnet drive shaft 90 to pass through. A retaining ring 102 is mounted to bushing 100 and against housing 94 for rotateably holding the bushing assembly in housing 94. Encoder assembly 104 is co-axially mounted around drive shaft 90 and contains a number of Hall-Effect switches H encased therein. Magnet 106 is mounted to drive shaft 90 and is adapted for being rotated thereon when shaft 18 is rotated by air motor 46. Magnet 106 has its north pole axially directed toward the closed end of base 12. Magnet 106 is sized so that the north pole thereof is located some distance from drive shaft 90 and extends over encoder assembly 104 and the encased Hall-Effect switches H so that the magnetic field of said magnet 106 will activate the Hall-Effect switches H when the magnet 106 is positioned overhead. In this way, the relative location of the apertures 16 is known as shaft 18 rotates. Switch bracket 108 and switch plate 110 are mounted on bearing support plate 98. Hall-Effect switch 112 is mounted on switch plate 110 and is actuated by magnet 113. As the top plate 10 raises, this causes magnet 113 to move away from switch 112 and sends a signal to the logic circuitry (not shown) and permits the top plate 10 to be indexed. When top plate 10 re-seats after indexing, the magnet 113 approaches switch 112 and signals the logic circuitry (not shown) that the top plate 10 is relocated and machining can continue. Hydraulic initiating means for raising top plate 10 comes from the logic circuitry (not shown) to hydraulic valve 114. Initiating means for lowering top plate 10 comes from the appropriate Hall-Effect switch H encapsulated in encoder 104. A top plan view of encoder 104 is best shown in FIG. 17 and discloses the Hall-Effect Switches H and the means for connecting with switch plate 110.

Figure 5:
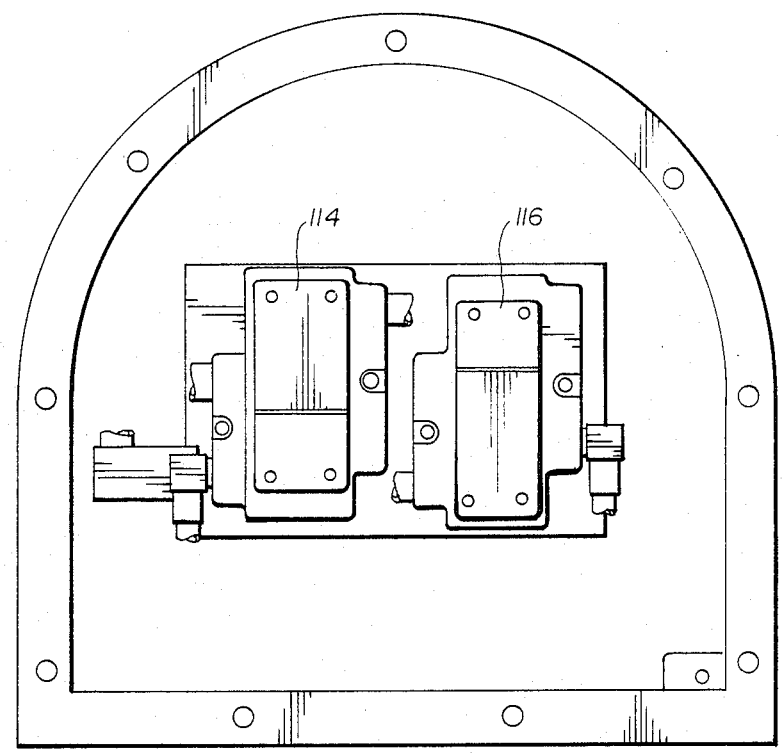
FIG. 5 is a plan view disclosing the hydraulic and pneumatic control valves.

Hydraulic valves 114 for displacing piston 62 are disclosed in FIG. 5. Likewise, pneumatic valves 116 for causing air motor 46 to turn are disclosed in FIG. 5.

Figure 6:
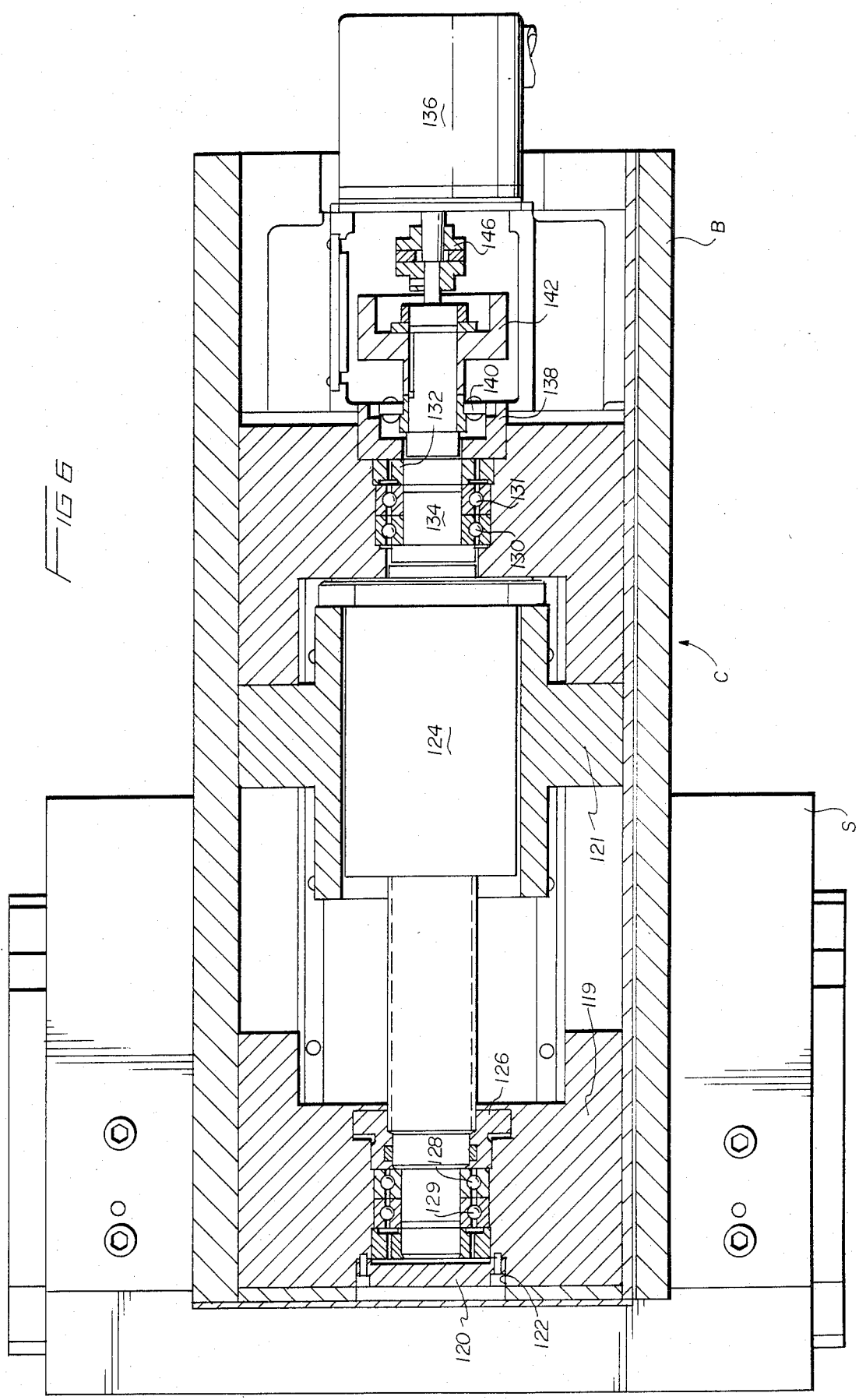
FIG. 6 is a cross-sectional view disclosing the carriage and cross-slide of FIG. 1.

Cross-slide C is best shown in FIG. 6. Carriage members 118 and 119 are screwed and doweled by means not shown to carriage S. Turret T is mounted on cross-slide C and is capable of moving longitudinally on the bed (not shown) by means of movement of carriage S which thereby moves cross-slide C. Housing 121 houses ball screw nut assembly 124. Housing 121 is screwed and doweled by means not shown in cross-slide C. Turret T mounted on cross-slide C may move transversally of carriage S by means of movement of body B of cross-slide C caused by ball nut 124.

Cross-slide C has a body B slideably connected to carriage S and has an axis extending transverse of the longitudinal axis of the machine tool spindle (not shown). Body B has an end cap 120 mounted in aperture 22 which is co-axial with the central axis of body B. Ball screw 124 is mounted in member 119 and has an adjusting nut 126 and an inner bearing 128 and an outer bearing 129 secured between adjusting nut 126 and end cap 120. Inner bearing 130, outer bearing 131 and race nuts 132 are co-axial with ball screw 124 and secured to the other end of ball screw 124.

Figure 8:
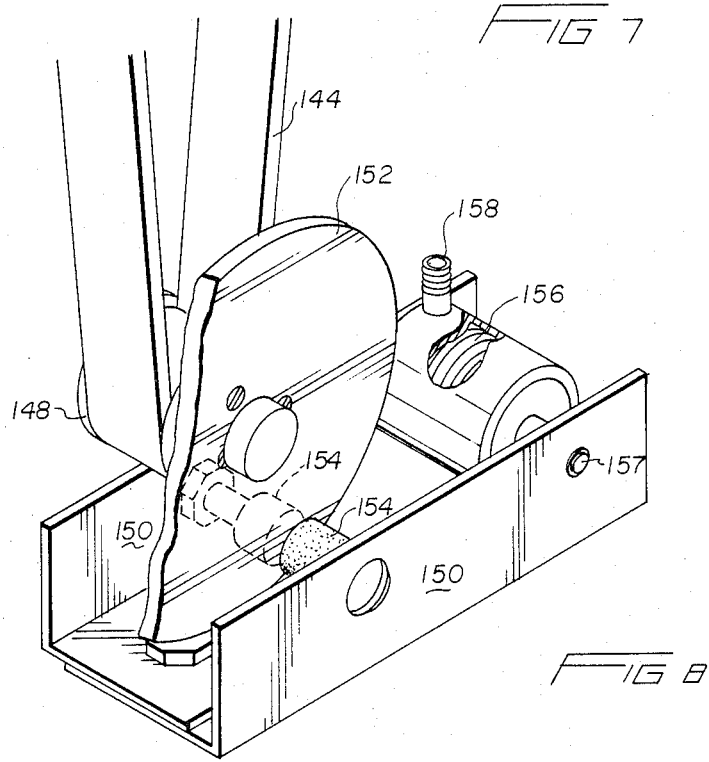
FIG. 8 is fragmentary perspective view of the cross-slide braking mechansim.

A shaft 134 is integral with, coincident with and co-axial with ball screw 124 and extends into feed back unit 136. Field mount 138 is mounted in member 118 and generates a magnetic field. Adaptor assembly 140 is mounted to pulley 142 and revolves with pulley 142 and ball screw nut assembly 124. A 40 tooth pulley 142 is mounted to shaft 134 so that the timing belt 144, as best shown in FIG. 8, may be connected to shaft 134. Coupling 146 connects shaft 134 to feed back unit 136. The field generated by field mount 138 and the adapter assembly 140 together comprise a tachometer. The tachometer generates a signal propertional to the RPM of ball screw 124 and feeds this information to the logic circuitry (not shown) to maintain constant speed.

As best shown in FIG. 8, timing belt 144 is connected to pulley 148 which is mounted by brackets 150 in housing H. Pulley 148 and disc 152 are bolted together and mounted to a servo motor shaft assembly (not shown). Opposed brake pads 154 are arranged in brackets 150 to contact disk 152 when no air pressure is applied to piston 157 having air inlet 158. When air is applied to piston 157, spring 156 is compressed by piston 157 and forces brackets 150 and pads 154 to move out of contact with and to disengage from disc 152 to permit pulley 148 to rotate. When the servo motor (not shown) which drives pulley 148 is not operating, the cross-slide is maintained in position by the brake pads 154. Consequently, a mechanism for preventing the turret T from drifting downward on cross-slide C when the machine is not operating has been created. Likewise, a mechanism for preventing damage to the machine due to premature operation of the servo motor (not shown) has likewise been disclosed.

Figure 7:
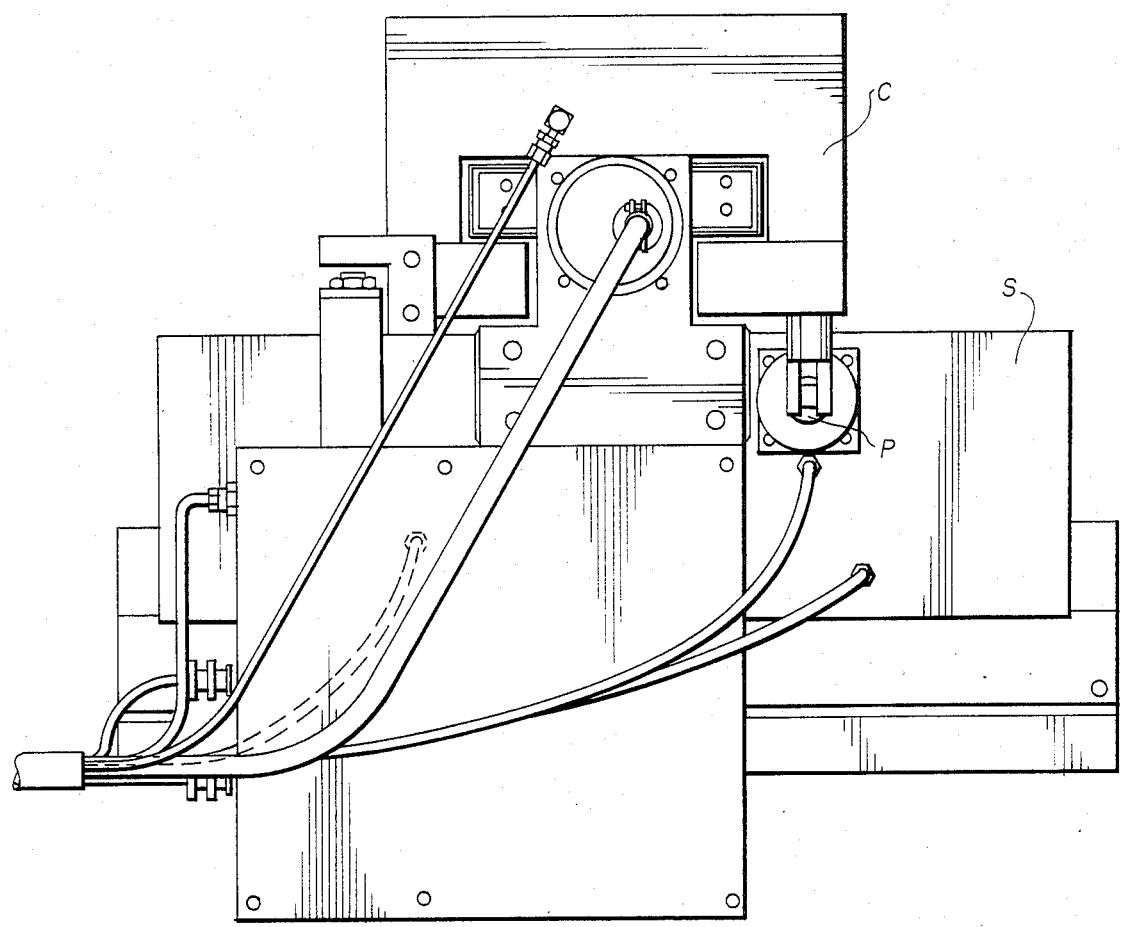
FIG. 7 is a rear elevational view of a machine tool employing the turret and slide assembly of the invention and disclosing the hydraulic, pneumatic and electrical connections.

The pneumatic, hydraulic, and electrical connections and the machine tool of the invention are mounted to the rearward side of the machine tool as best shown in FIG. 7.

Figure 14:
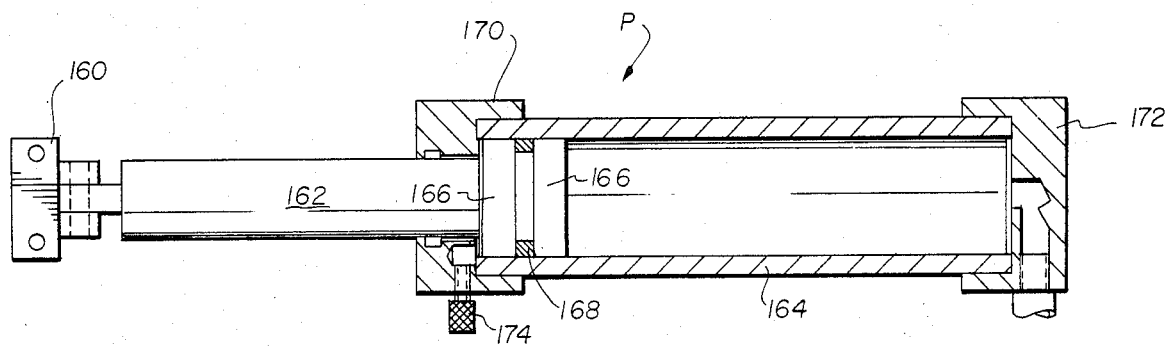
FIG. 14 is a cross-sectional view of the counter balance assembly of FIG. 1.

As best shown in FIG. 1, cross-slide C includes a counterbalance piston assembly P for insuring that equal force is applied to displace the Turret T both away from and toward the longitudinal axis of the machine tool spindle (not shown). As best shown in FIG. 14, counter-balance assembly P includes bracket 160 mounted to cross-slide C adjacent feed back unit 136. Piston 162 is connected thereto and leads to cylinder 164. Piston 162 is free to be displaced in cylinder 164. Piston 162 has annular bearing members 166 with quadring 168 positioned therebetween and bearings 166 are free to be displaced in piston cylinder 164. Cylinder 164 and end caps 170 and 172 close cylinder 164. Muffler filter 174 is connected to cylinder 164 for preventing the entrance of contaminants into cylinder 164. Counterbalance assembly P is adjusted so that an equivalent amount of force or work is necessary to both raise and lower turret T on cross-slide C.

Figure 15:
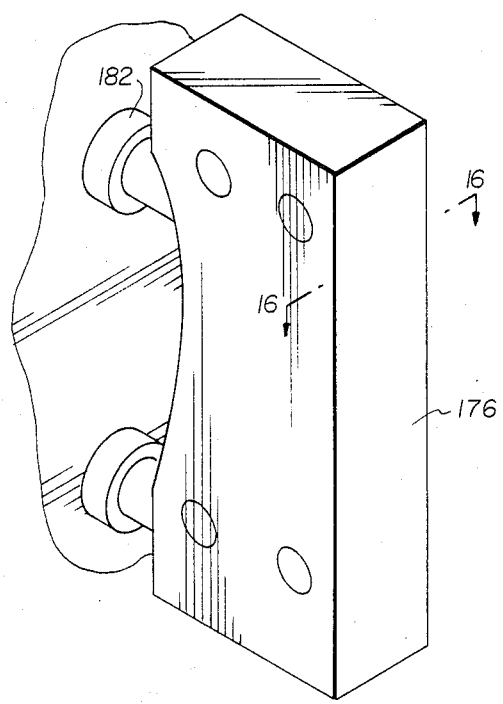
FIG. 15 is a perspective view of the coolant block assembly.
Figure 16:
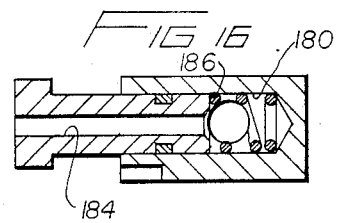
FIG. 16 is a cross-sectional view along the section 16—16 of FIG. 15 and disclosing the spring loaded fluid extension ducts of the coolant system; and, FIG. 17 is a top plan view of the magnetic encoder assembly.

As best shown in FIG. 15, coolant block 176 is mounted on the exterior of body 12 at bolt holes 178, as best shown in FIG. 2. Coolant block 176 has an inlet (not shown) for admitting coolant to chamber 180, as best shown in FIG. 16. Axially extending cylindrical fluid duct extensions 182 with centrally located apertures 184 therethrough communicate with chamber 180 and are engaged by springs 186 and are axially displaceable upwardly towards top plate 10. Fluid duct extensions 182 are forced upwardly by springs 186 and contact the underside of top plate 10 and are in sliding sealing contact therewith. As best shown in FIG. 9, top plate 10 has a number of apertures 188 which are in fluid communication with fluid duct extensions 182. Apertures 188 can be seen in FIG. 2 as protruding from top plate 10 nearby apertures 16. As best shown in FIG. 9, tool holder 190 mounted in aperture 16 has ducts 192 which communicate with apertures 188. Tool 194 mounted in tool holder 190 has apertures 196 which communicate with ducts 192 and which cause fluid (not shown) to be directed outwardly for contacting tool 194 when tool 194 is performing work. It should be readily apparent, that if coolant is not necessary that the use of a tool holder 190 without ducts 192 will effectively block apertures 188 and prevent coolant from escaping therefrom. Because fluid duct extensions 182 make a sliding and sealing contact with the underside of top plate 10 when an aperture 188 is not lined up therewith, fluid is consequently prevented from spilling therefrom. Therefore, a system for directing fluid to the appropriate working aperture 16 has been provided. An end working annular top plate 11 without coolant ducts is shown in FIGS. 12 and 13.

OPERATION

In normal operation, turret T is mounted on cross-slide C which is connected to carriage S which is mounted in bed ways (not shown) of a machine tool (not shown). Carriage S is capable of being laterally displaced in bed ways (not shown) for bringing cross-slide C toward or away from the spindle (not shown). Cross-slide C is transversely displaceable on carriage S for bringing tool 194 into contact with the work piece (not shown).

Top plate 10 has a number of apertures 16 for holding a number and a variety of tools 194. When it is necessary to change tools, this may be accomplished by indexing top plate 10 so that the appropriate tool 194 is placed in position for contacting the work (not shown). When indexing is necessary, cylinder 62 is displaced to cause face gear 30 to become disengaged from face gear 32. After the face gears 30 and 32 are disengaged, shaft 18 is free to be rotated by gear 48 of air motor 46. Introduction of air into air motor 46 causes gear 48 to rotate and thereby rotates shaft 18 which in turn rotates top plate 10. Rotation detection means R monitors the rotation of shaft 18 and, when the appropriate tool 194 is in its working position, closes pneumatic valve 116 to stop rotation of air motor 46 and to open hydraulic valve 114 to activate cushioned stopping means 76 to stop rotation of shaft 18. Hydraulic valves 114 have a time delay built in to allow sufficient time for shaft 18 to cease rotation prior to initiating the flow of hydraulic fluid to cause cylinder 62 to be displaced downwardly so that face gear 30 will mesh with face gear 32 and thereby clamp top plate 10 or top plate 11 to body 12.

Because springs 186 allow fluid extension ducts 182 to be axially displaced, fluid extension ducts 182 are always in contact with the underside of top plate 10. Consequently, the coolant supply system is allowed to run continuously as fluid duct extension 182 are able to be displaced with top plate 10 without creating a gap which would allow fluid to escape. When top plate 10 is lowered by displacement of cylinder 62, fluid extension ducts 182 compress springs 186 and thereby maintain the seal.

While this invention has been described as having a preferred design, it is understood that it is capable of further modification uses and/or adaptations of the invention following in general the principles of the invention including such departures from the present disclosure as come within known or customary practice in the art to which the invention pertains, and as may be applied to the central features hereinbefore set forth, and fall within the scope of the invention of the limits of the appended claims.

What I claim is:

1. An indexable machine tool turret, comprising:
   (a) a body having a chamber with an open end, a closed end and a central longitudinal axis;
   (b) an axially displaceable rotatable turret top plate closing said open end and having a number of spaced apertures for holding tools and said top plate being coaxial with said central axis;
   (c) an axially extending axially displaceable rotatable shaft connected to said top plate coaxial with said top plate;
   (d) two opposed cooperating annular gears for seating said top plate to said body;
   (e) one of said cooperating gears associated with said top plate and the other of said gears associated with said body;
   (f) means rotating said shaft;
   (g) means axially displacing said shaft and thereby said top plate for causing said cooperating gears to engage and disengage;
   (h) rotation stopping means;
   (i) angular rotation detection means determining the rotation of said shaft;
   (j) control means cooperating with said rotation stopping means in response to said angular rotation detection means for operating said shaft rotating means and for activating said rotation stopping means when a selected one of said aperatures has rotated to a predetermined position;
   (k) said shaft, said cooperating gears, said means displacing said shaft and said angular rotation detection means mounted substantially in said chamber;
   (l) said body includes an auxiliary chamber;
   (m) said shaft includes a radially extending flange with a ring gear mounted thereto;
   (n) said shaft rotating means includes an air motor having gear means engaging and rotating said ring gear and thereby said shaft;
   (o) said air motor mounted in said auxiliary chamber;
   (p) means supplying air to said air motor;
   (q) said auxiliary chamber includes a first aperture permitting engagement of said ring gear with said air motor gear; and,
   (r) said auxiliary chamber further includes a second aperture communicating exhaust air of said air motor to said body chamber and pressurizing said body chamber during operation of said air motor and thereby preventing entry of contaminants into said body chamber.

2. An indexable machine tool turret as described in claim 1, wherein:
   (a) said air motor having an axis parallel to said central axis.

3. An indexable machine tool turret as described in claim 1, further including:
   (a) displaceable seal means mounted about said open end and positioned between said body and said top plate for sealing said chamber; and,
   (b) ajustable pressure reducing means mounted in said body and extending therethrough for maintaining said chamber pressure below a pre-determined set point.

4. An indexable machine tool turret as described in claim 1, wherein:
   (a) said cooperating gears are positioned adjacent said air motor.

5. An indexable machine tool turret as described in claim 3, wherein:
   (a) said pressure reducing means being mounted in said chamber closed end.

6. An indexable machine tool turret as described in claim 1, wherein:
   (a) said flange is positioned between said top plate and said displacement means.

7. An indexable machine tool turret as described in claim 1, wherein:
   (a) said stopping means are positioned between said displacement means and said angular rotation detection means.

8. An indexable machine tool turret as described in claim 1, wherein:
   (a) said rotation detection means are positioned between said stopping means and said closed end.

9. An indexable machine tool turret as described in claim 1, wherein:
   (a) said auxiliary chamber second aperture is located radially adjacent said detection means.

10. An indexable machine tool turret as described in claim 1, wherein:
    (a) said rotation detection means includes a magnet drive shaft slideably mounted in an axially extending aperture in said shaft coincident with said shaft axis;
    (b) an encoder assembly circumferentially mounted around said drive shaft and including magnetically activated switches encased therein; and,
    (c) a magnet rotateably connected to said drive shaft and having a portion extending over said encapsulated switches for causing said switches to be activated when said magnet is positioned adjacent said switches.

11. An indexable machine tool turret as described in claim 1, further comprising:
   (a) said top plate including a number of spaced ducts for conveying coolant to a tool holder mounted in said top plate and for conveying said coolant toward a tool mounted thereto.

12. An indexable machine tool turret as described in claim 1, further comprising:
   (a) said top plate including a number of spaced ducts for conveying coolant, said ducts having an inlet on said top plate lower side and an outlet adjacent said top plate spaced apertures;
   (b) a tool holder mounted in one of said top plate apertures and having fluid ducts aligned with and coincident with said top plate ducts;
   (c) a tool mounted in said tool holder and having an axis parallel to said longitudinal axis;
   (d) said tool holder fluid duct having an outlet spaced from said tool axis and adapted for directing coolant fluid towards said tool; and,
   (e) a coolant block mounted to said body and including axially displaceable fluid duct extensions for contacting said top plate lower side and for being displaceable with and in sliding and sealing contact with said top plate and whereby fluid flows through said fluid duct extensions for communicating with said top plate ducts when one of said top plate ducts is indexed and coincident with said extensions and further wherein said fluid communicates with said other ducts to cool said tool.

13. An indexable machine tool turret as described in claim 12, further including:
   (a) at least two fluid duct extensions;
   (b) at least two coolant ducts for each of said apertures; and,
   (c) at least two tool holder fluid ducts.

14. An indexable machine tool turret as described in claim 13, wherein:
   (a) said duct extensions being spring-loaded and adapted for being displaced with said top plate.

15. An indexable machine tool turret as described in claim 12, wherein:
   (a) said duct extensions being substantially cylindrical.

16. An indexable machine tool turret as described in claim 1, wherein:
   (a) said auxiliary chamber is closed for minimizing noise of said air motor.

17. An indexable machine tool turret as described in claim 1, further comprising:
   (a) a longitudinally displaceable carriage mounted in a bed way of a machine tool;
   (b) a displaceable cross-slide slidingly mounted on said carriage and adapted for movement transverse of said bed way; and,
   (c) said turret mounted on said cross-slide.

18. An indexable machine tool turret as described in claim 17, further comprising:
   (a) cylinder means for adjusting the force required to displace said cross-slide on said carriage.

19. An indexable machine tool turret as described in claim 17, further comprising:
   (a) means for preventing the unintended displacement of said cross-slide on said carriage.

20. An indexable machine tool turret as described in claim 17, further comprising:
   (a) a ball screw rotatably mounted in said cross-slide for displacing said cross-slide transverse of said bed way;
   (b) a shaft coincident with and integral with said ball screw and extending therefrom;
   (c) a pulley mounted to said shaft;
   (d) a housing mounted adjacent said carriage;
   (e) a second pulley connected to said housing co-planar with said first pulley;
   (f) said second pulley having a disk mounted thereto;
   (g) a rotating belt connecting said first pulley and said second pulley;
   (h) at least two opposed displaceable brake pads for contacting said disk for stopping said second pulley and thereby said belt rotation; and,
   (i) brake pad engaging means for causing said brake pads to engage and disengage from said disc to allow said turret to be displaced.

* * * * *